J. T. FULLER.
INSECT EXTERMINATOR.
APPLICATION FILED OCT. 24, 1921.

1,433,885.

Patented Oct. 31, 1922.
2 SHEETS—SHEET 1.

Inventor
James T. Fuller

Attorney

Patented Oct. 31, 1922.

1,433,885

UNITED STATES PATENT OFFICE.

JAMES T. FULLER, OF MIDLOTHIAN, TEXAS.

INSECT EXTERMINATOR.

Application filed October 24, 1921. Serial No. 509,831.

*To all whom it may concern:*

Be it known that I, JAMES T. FULLER, a citizen of the United States, residing at Midlothian, in the county of Ellis and State of Texas, have invented certain new and useful Improvements in Insect Exterminators, of which the following is a specification.

This invention relates to new and useful improvements in insect exterminators.

It is customary to cut stalks, such as cotton stalks, rake the same into piles and burn the same in order to destroy such insects as boll weevils. Such a method is, however, but partially efficient for the reason that when the stalks are cut, the weevils fall to the ground and cannot be raked up with the stalks.

The object of my invention is to destroy the weevil at the time the stalks are cut, by burning the cut stalks where they fall on the ground and without raking.

In carrying out the invention I provide a wheel supported device adapted to be coupled close behind a stalk cutter and including a hood which is dragged in rear of the cutter over the stalks which have been cut. Means for maintaining a hot flame under the hood is provided and in this way everything over which the hood passes is burned.

A construction designed to carry out the invention will be hereinafter described together with other features of the invention.

Figure 1:
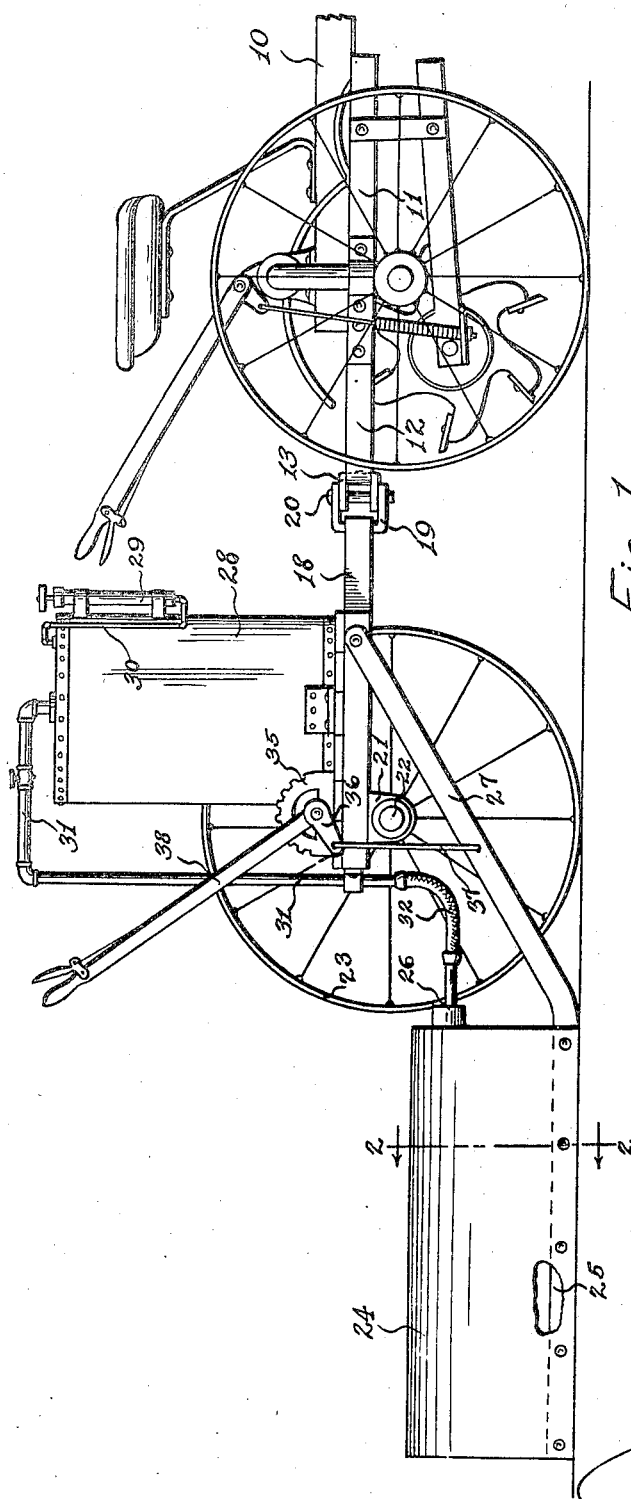
Figure 2:
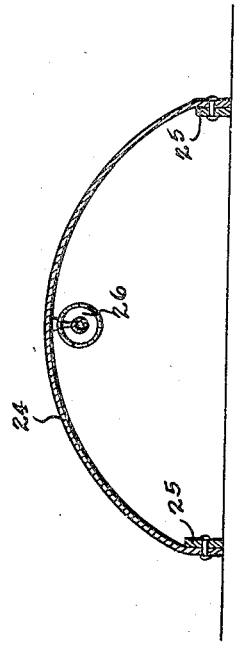
Figure 3:
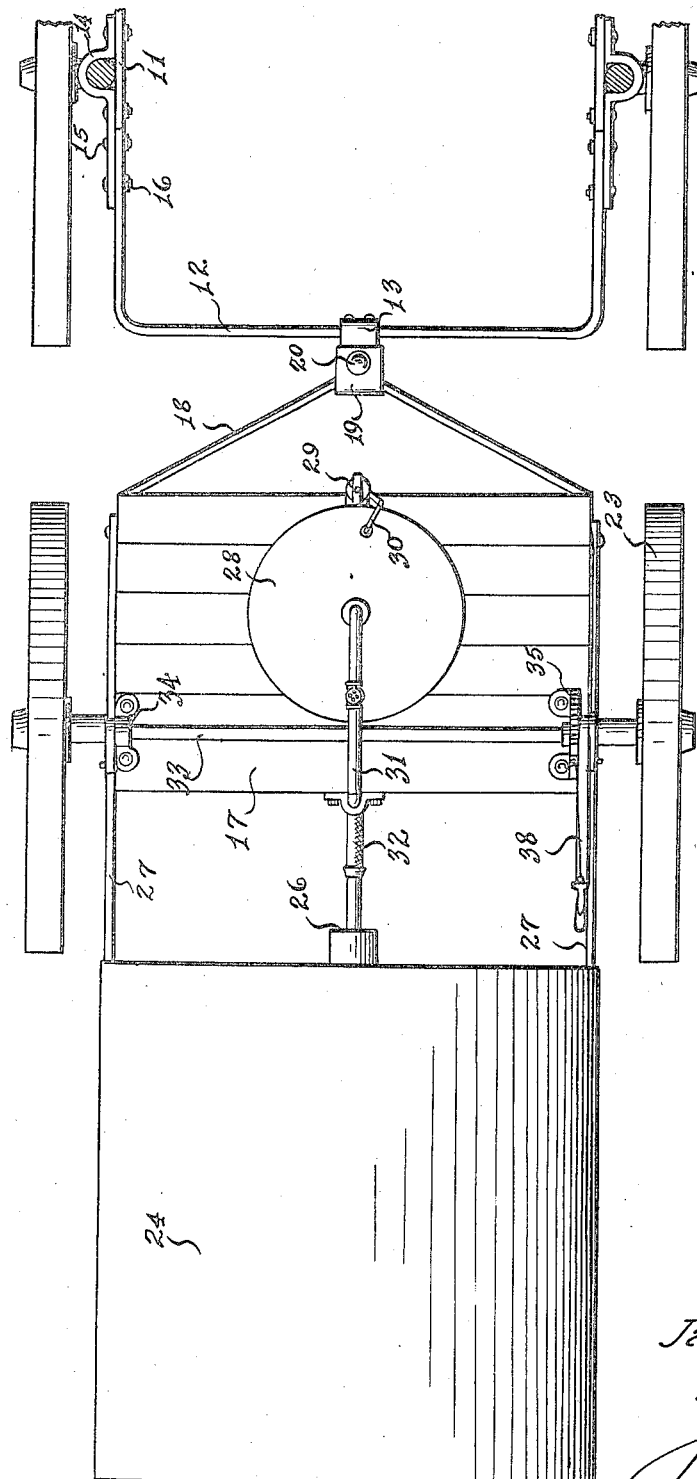

The invention will be more readily understood from a reading of the following specification and by reference to the accompanying drawings, in which an example of the invention is shown and wherein:

Fig. 1 is a side elevation of a stalk cutter coupled to an exterminator embodying my invention, Fig. 2 is a cross section on the line 2—2 of Fig. 1, and Fig. 3 is a plan view.

In the drawings the numeral 10 designates an ordinary stalk cutter and 11 the frame thereof. Extending rearwardly of the frame is a yoke 12 at the center of which a clevis 13 is secured in a suitable manner. The ends of said yoke are fastened to the end of the frame by means of brackets 14, which are secured by bolts 15 and nuts 16.

The exterminator embodying my invention comprises a wheel supported platform 17, extending forwardly from which is a yoke 18 carrying a clevis 19 at its center adapted to telescope with the clevis 13 secured to the yoke of the stalk cutter. The clevises 19 and 13 have corresponding apertures which are registered to receive a pivot bolt 20. A hanger 21 suitably secured to the platform depends from each side of the same at the rear, the said hangers being adapted to support an axle 22 carrying wheels 23.

An arcuate hood 24 is supported on runners 25 and adapted to drag on the ground in rear of the platform, the said hood carrying an ordinary gas burner 26. The runners are extended forwardly and upwardly to form draw bars 27 which are suitably pivoted to the sides of the platform.

Mounted on the platform and fastened thereto in any suitable manner is a compressed oil tank 28, on the side of which is secured a hand pump 29 whereby air may be forced into the tank through a pipe 30 for the purpose of compressing the oil in the tank. Oil is fed to the burner 26 in the usual manner through a pipe 31 which projects upwardly through the top of the tank and extends to the burner. The pipe is provided with a flexible joint 32, so as to permit vertical adjusting of the hood.

In rear of the tank and located on the platform is a rocking shaft 33 which is journaled at one end in a bracket 34, and at the other in a locking segment 35. Each end of the shaft is provided with an arm 36. Links 37 are connected to the arms at one end and to the draw bars 27 at the other. A lever 38 is pivoted on one end of the shaft between the arm and locking segment, the lever having a locking plunger which engages the segment. During the operation of the exterminator it is sometimes necessary to adjust the hood vertically so that the same may ride over obstacles or variations in the path; such adjustments may be readily accomplished by means of the lever 38, as is obvious.

It will be seen that the hood is of such width as to cover the path of the cutters transversely. As the cutters revolve and cut the stalks, the hood follows in the path destroying the stalks, weevils and the like by means of the heat and flames from the burner.

By means of the pivotal connection of the clevises 13 and 19, the exterminator will readily conform to any changes of movement or direction of the stalk cutter.

When it is desired to use the exterminator on a field where the stalks have already been cut, it will be readily seen that a tongue and doubletree may be suitably fastened to the exterminator whereby it may be drawn as a unit.

Various changes in the size and arrangement of the different parts, as well as modifications, may be made without departing from the spirit of the invention.

What I claim is:

In an insect and vegetation exterminator, the combination with a stalk cutter having a drum, of a wheeled frame connected in rear of the cutter drum, a platform mounted on the frame, a fuel tank mounted on the platform, an elongated arcuate hood located in rear of said frame and adapted to straddle a row of stalks, runners carrying said hood and terminating in inclined pivotal supports connected to said frame, a burner mounted in said hood, a fuel conductor extending from said tank to said burner, a transverse rock shaft mounted on the said frame, a lever for actuating said shaft, and links connected with said shaft and the inclined supports, whereby the said hood may be adjusted vertically by operating said shaft.

In testimony whereof I affix my signature.

JAMES T. FULLER.